(12) United States Patent
Barz et al.

(10) Patent No.: US 7,479,245 B2
(45) Date of Patent: Jan. 20, 2009

(54) PROCESS FOR APPLYING A MATERIAL TO A MEMBER

(75) Inventors: William J. Barz, St. Clair, MI (US); Patrick A. Moore, Lapeer, MI (US)

(73) Assignee: Zephyros, Inc., Romeo, MI (US)

( * ) Notice: Subject to any disclaimer, the term of this patent is extended or adjusted under 35 U.S.C. 154(b) by 852 days.

(21) Appl. No.: 10/855,015

(22) Filed: May 27, 2004

(65) Prior Publication Data

US 2004/0262810 A1 Dec. 30, 2004

Related U.S. Application Data

(60) Provisional application No. 60/482,804, filed on Jun. 26, 2003, now abandoned.

(51) Int. Cl.
B29C 70/74 (2006.01)
B29C 70/76 (2006.01)

(52) U.S. Cl. .................... 264/267; 264/275; 264/297.6

(58) Field of Classification Search .................. None
See application file for complete search history.

(56) References Cited

U.S. PATENT DOCUMENTS

| | | | | |
|---|---|---|---|---|
| 3,276,115 A | * | 10/1966 | Hansz | 29/527.1 |
| 3,462,333 A | * | 8/1969 | McCormick | 156/245 |
| 3,490,099 A | * | 1/1970 | Smith | 425/112 |
| 4,269,802 A | * | 5/1981 | Linne | 264/255 |
| 4,321,225 A | * | 3/1982 | Jelinek | 264/138 |
| 4,464,322 A | * | 8/1984 | Butler | 264/138 |
| 4,769,951 A | | 9/1988 | Kaaden | |
| 4,813,690 A | | 3/1989 | Coburn, Jr. | |
| 5,358,397 A | | 10/1994 | Ligon et al. | |
| 5,382,397 A | | 1/1995 | Turner, Jr. | |
| 5,421,940 A | | 6/1995 | Cornils | |
| 5,575,526 A | | 11/1996 | Wycech | |
| 5,658,509 A | | 8/1997 | Sawyer et al. | |
| 5,733,493 A | * | 3/1998 | Katsuno et al. | 264/255 |
| 5,755,486 A | | 5/1998 | Wycech | |
| 5,766,719 A | | 6/1998 | Rimkus | |
| 5,817,268 A | * | 10/1998 | Ito | 264/254 |
| 5,932,680 A | | 8/1999 | Heider | |
| 6,103,341 A | | 8/2000 | Barz et al. | |
| 6,131,897 A | | 10/2000 | Barz et al. | |
| 6,146,565 A | | 11/2000 | Keller | |
| 6,383,610 B1 | | 5/2002 | Barz et al. | |
| 6,422,575 B1 | | 7/2002 | Czaplicki et al. | |

(Continued)

FOREIGN PATENT DOCUMENTS

DE 4320257 A1 12/1994

(Continued)

OTHER PUBLICATIONS

Copending U.S. Appl. No. 60/558,278, filed Mar. 31, 2004.
Copending U.S. Appl. No. 10/867,835, filed Jun. 15, 2004.

*Primary Examiner*—Edmund H. Lee
(74) *Attorney, Agent, or Firm*—Dobrusin & Thennisch PC

(57) ABSTRACT

There is disclosed a process for applying a material to a member having an adhesion surface. Typically, the process includes applying the material to a mold, the member or both. Thereafter, the material is at least partially conformed to the shape of the mold.

15 Claims, 4 Drawing Sheets

U.S. PATENT DOCUMENTS

| | | |
|---|---|---|
| 6,550,847 B2 | 4/2003 | Honda et al. |
| 6,656,406 B2 * | 12/2003 | Parrinello .................. 264/268 |
| 6,811,864 B2 | 11/2004 | Czaplicki et al. |
| 2002/0164450 A1 | 11/2002 | Lupini et al. |
| 2003/0140671 A1 | 7/2003 | Lande et al. |
| 2004/0011282 A1 | 1/2004 | Myers et al. |
| 2004/0021271 A1 * | 2/2004 | Tratnik ...................... 277/616 |
| 2004/0079478 A1 | 4/2004 | Merz |

FOREIGN PATENT DOCUMENTS

| | | |
|---|---|---|
| EP | 1134126 A2 | 9/2001 |
| ES | 2013344 | 5/1990 |
| GB | 2 375 328 A | 11/2002 |
| JP | 10-71628 | 3/1998 |
| WO | WO 99/36243 | 7/1999 |
| WO | WO 00/03894 | 1/2000 |
| WO | WO 00/10802 | 3/2000 |
| WO | WO 00/38863 | 7/2000 |
| WO | WO 00/46461 | 8/2000 |
| WO | WO 01/54936 | 8/2001 |
| WO | WO 01/83206 | 11/2001 |
| WO | 2005/000553 A3 | 1/2005 |

* cited by examiner

PROCESS FOR APPLYING A MATERIAL TO A MEMBER

CLAIM OF BENEFIT OF FILING DATE

The present application claims the benefit of the filing date of U.S. Provisional Application Ser. No. 60/482,804, filed Jun. 26, 2003 now abandoned, hereby incorporated by reference.

FIELD OF THE INVENTION

The present invention relates generally to a process for applying a material to a member. More particularly, the present invention relates to a process for applying a material to a surface of a member by applying the material to a mold followed by adhering the material to a surface of the member.

BACKGROUND OF THE INVENTION

For many years, industry has been concerned with providing materials to a member for forming seals, baffles, reinforcements or the like. Application of such materials can cause a variety of difficulties. For example, and without limitation, it can be difficult to locate the materials on the members within prescribed tolerances. As another example, it can be difficult to maintain relatively low labor and equipment costs for applying the materials to the members. As still another example, it can be difficult to process the materials in a manner that can maintain desired material integrity. Thus, the present invention provides a process for applying a material to a surface of a member wherein the process overcomes one or more of the above difficulties or other difficulties.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention is predicated upon providing an improved process for applying a material to a member of an article of manufacture. It is contemplated that the process may be employed for applying a variety of different materials to members of a variety of different articles of manufacture. For example, the material may be an adhesive material, a baffling material, a reinforcement material, a vibrational damping material, a sealing material, combinations thereof or the like. Exemplary articles of manufacture include airplanes, boats, buildings, furniture or the like. Advantageously, however, the process of the present invention has been found particularly useful for applying expandable materials, curable materials or both to members of automotive vehicles.

Accordingly, the process of the present invention typically includes one or more of the following steps:

1) applying material to a mold preferably while the material is in a viscoelastic state;
2) contacting the surface of a member to the material as the material is at least partially conforming to the shape of a contour of the mold;
3) moving the member away from the mold with the material adhered to the surface of the member The present invention is directed to a process for applying a material to a member of an article of manufacture. For exemplary purposes, FIGS. 1A-4B illustrate, and the present description discusses, in detail, the process of the present invention as it is applied to a particular member of an automotive vehicle. However, it is contemplated that the process may be applied to many members of an automotive vehicle as well as many members of other articles of manufacture. Thus, the present invention should not be limited to any particular member of an automotive vehicle or to members of automotive vehicles unless otherwise specifically stated.

Figure 1A:
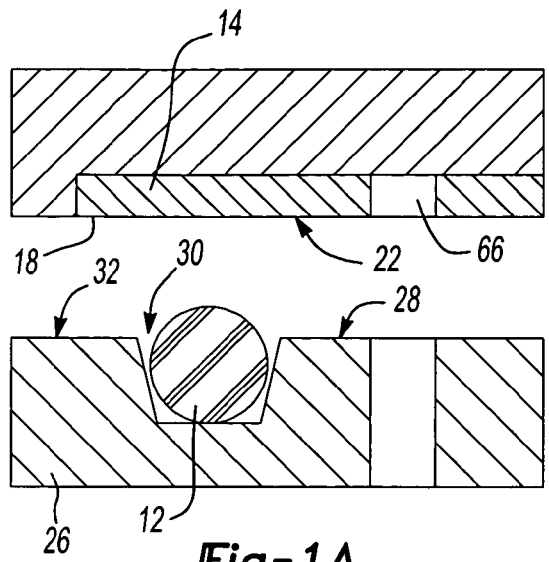
FIGS. 1A-1D are sectional view of a member and a mold during application of an expandable material to the member according to an exemplary process of the present invention.
Figure 1B:
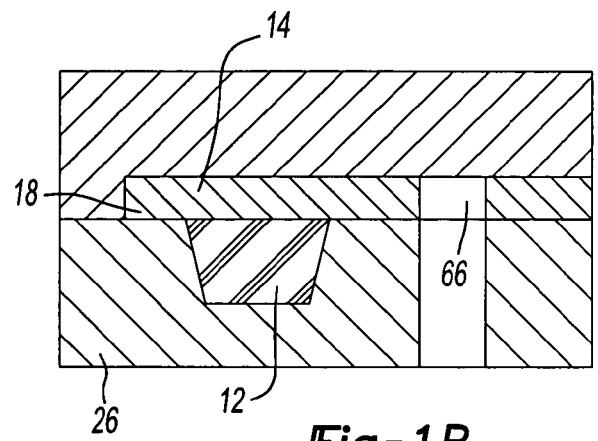
Figure 1C:
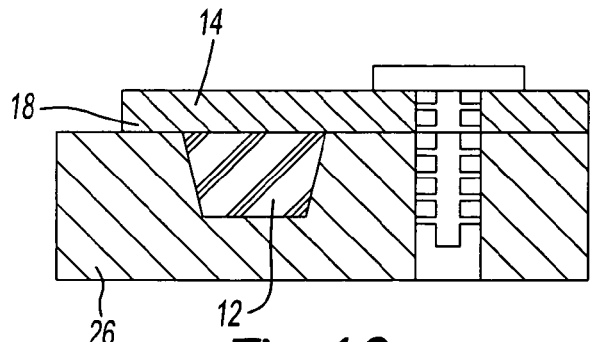
Figure 1D:
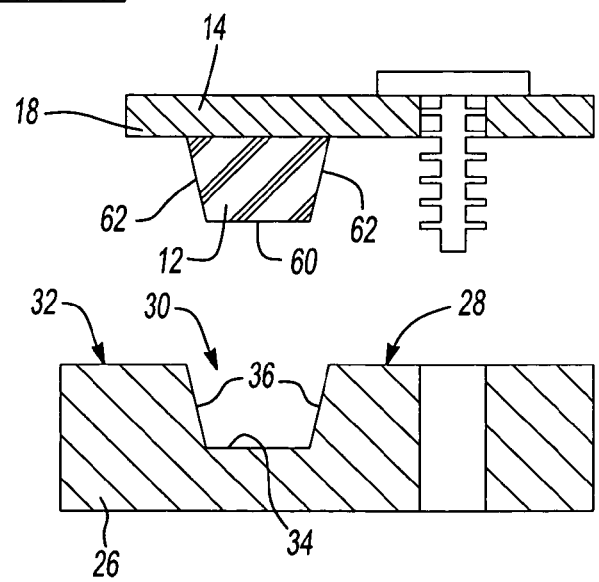
Figure 2:
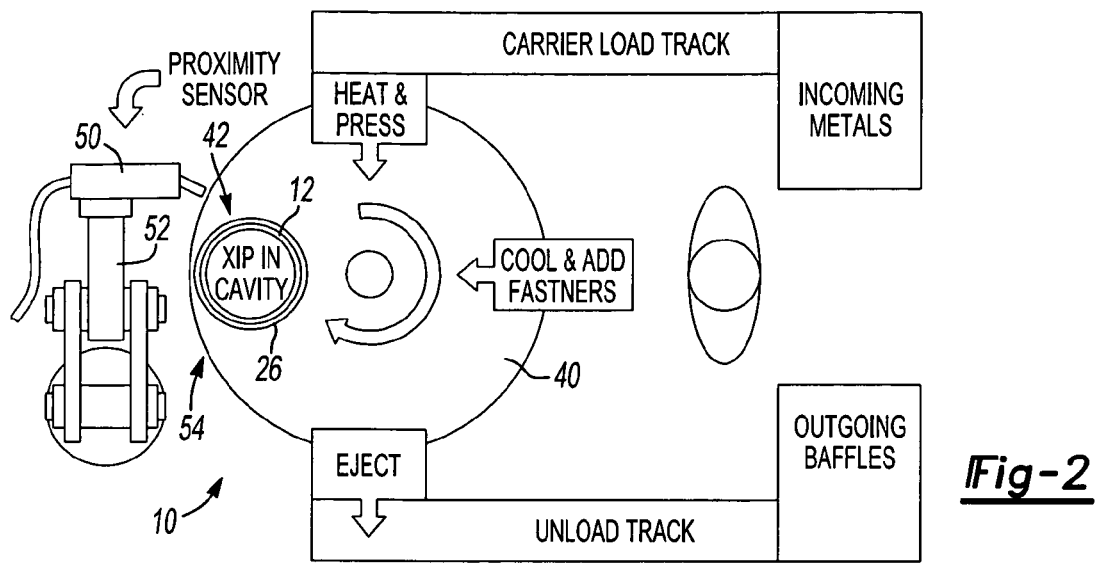
FIG. 2 is a schematic diagram of an exemplary process according to an embodiment of the present invention.

For illustrative purposes, reference should be made to FIGS. 1A-3B. FIG. 2 schematically illustrates an exemplary process 10 of applying a material 12 to a member 14 of an automotive vehicle. FIGS. 1A-1D illustrate a peripheral portion 18 of the member 14 as the material 12 is applied (e.g., adhered) to an adhesion surface 22 of the member 14 by the exemplary process 10.

According to the process 10, a mold 26 is provided having a surface 28 suitable for receiving the material 12. In the particular embodiment illustrated, the mold 26 is circular, disk-shaped or both. However, it is contemplated that the mold 26 may be formed in a variety of shape and configurations.

Preferably, the surface 28 includes at least one contour and an adjoining surface but may include plural contours and plural adjoining surfaces. It is also contemplated the mold may be without contours and may include only one surface (e.g., a planar surface).

As used herein, the term adjoining surface can mean any surface adjacent the contour and the term contour is intended to mean any surface that is non-coplanar relative to the adjoining surface. Thus, a contour could be an opening (e.g., a cavity, a groove, a channel, a notch a combination thereof or the like), a protrusion (e.g., a bump, a ripple, a hill, an elongated protrusion, an annular protrusion, a combination thereof or the like) a combination thereof or the like. In the illustrated embodiment, a contour 30 is formed as a cavity (e.g., an annular channel) extending into the mold 26 from an adjoining planar surface 32. As shown, the cavity has a bottom surface 34 and a pair of flared opposing side surfaces 36.

In addition to providing the mold 26, the member 14 is also provided according to the process 10 of the present invention. The member 14 illustrated is a cover fuel sender, however, the process of the present invention may be performed on any suitable member of any suitable article of manufacture. Whatever member is chosen for application of the material 12, it is preferable that the member include an adhesion surface, which may be contoured, planar or otherwise configured. In the embodiment shown, the member 14 has an adhesion surface 40 that is generally planar. Also, as shown, the adhesion surface 40 is planar, but may be otherwise shaped in any configuration.

A variety of materials may be applied according to the process of the present invention. In one embodiment, material 12 may be formed of a heat activated material having foamable characteristics. The material may be generally dry to the touch or tacky and be shaped in any form of desired pattern, placement, or thickness, but is preferably of substantially uniform thickness. One exemplary expandable material is L-7102 foam available through L&L Products, Inc. of Romeo, Mich. Another exemplary expandable material is disclosed in U.S. Provisional patent application 60/482,897, titled "Expandable Material", filed on the same date as this application and incorporated herein by reference for all purposes.

Though other heat-activated materials, a preferred heat activated material is an expandable polymer or plastic, and preferably one that is foamable. A particularly preferred material is an epoxy-based foam, which may be structural, sealing or both. For example, and without limitation, the foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing, sealing or baffling foams are known in the art and may employed in the present invention. A typical foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred foam formulation is an epoxy-based material that is commercially available from L&L Products of Romeo, Mich., under the designations L5206, L5207, L5208, L5209. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials.

While the preferred material has been disclosed, other materials may be used as well, particularly materials that are heat-activated or otherwise activated by an ambient condition (e.g. moisture, pressure, time, chemical reaction or the like) and cure in a predictable and reliable manner under appropriate conditions for the selected application. Of course, the material may also be formed of non-activatable materials, non-expandable materials or otherwise. Thus, upon activation, the material soften, cure and expand; soften and cure only; cure only; soften only; or may be non-activatable.

One example of a material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the material include high glass transition temperature (typically greater than 70 degrees Celsius), and adhesion durability properties. In this manner, the material does not generally interfere with the materials systems employed by automobile manufacturers.

In applications where the material is heat activated, thermally expanding material, an important consideration involved with the selection and formulation of the material comprising the foam is the temperature at which a material reaction or expansion, and possibly curing, will take place. Typically, the foam becomes reactive at higher processing temperatures, such as those encountered in an automobile assembly plant, when the foam is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges. Generally, suitable expandable foams have a range of expansion ranging from approximately 0 to over 1000 percent.

In another embodiment, the material may be provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

The material or medium may be at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) placed along the mold through the use of baffle technology; a die-cast application according to teachings that are well known in the art; pumpable application systems which could include the use of a baffle and bladder system; and sprayable applications.

The material 12 may be applied to (e.g., located adjacent or contacted with) the mold, the member 14 or both simultaneously. Typically, the material is applied to the one or more contours of the mold, to the surface of the member 14 or both. It is also typical for the surface or contour of the mold that contacts the material to be non-stick (i.e., substantially non-susceptible to adhesion by the material). Moreover, it is typically desirable that the material does not substantially wet the surface of the mold, although some wetting may still occur. For avoiding such wetting, the material may be applied to the mold at a relatively low temperature (e.g. below 100° C., below 70°, or lower) and preferably in a substantially non-molten state, although not required.

During application, the mold 26 may be provided in a dynamic state or a static state. For example, the mold may be located, secured or both upon a moving surface such as a conveyor belt surface, a rotating table surface or the like for providing the mold in a dynamic state. As an alternative example, the mold may be located, secured or both upon a stationary surface during application for providing the mold in a static state.

The application of the material to the mold may be accomplished manually, automatically or a combination thereof. In the illustrated embodiment, the mold 26 is manually or automatically placed upon a rotating table 40. The table 40 preferably includes one or more fixtures (not shown) for assisting in placing the mold 26 at a predetermined location 42 of the table 40. Thereafter, the material 12 is applied as a continuout bead to the surface 28 of the mold 26, and more particularly to the contour 30 or bottom surface 34 of the mold 26. In alternative embodiments, however, it is contemplated that the material may be applied to any of the surfaces 28, 32, 34 or 36 or the contour 30 of the illustrated mold 26 or any surface of another different chosen mold.

The material 12 may be applied to the mold with a variety of applicators such as a pump (e.g., pump gun), a tube, an individual's hands, a combination thereof or the like and may be applied manually, automatically or a combination thereof (e.g., semi-automatically). In a preferred embodiment, an extruder 50 is employed to apply the material 12 to the mold 26. Examples of extruders and extrusion techniques, which may be employed in conjunction with the present invention are disclosed in U.S. Pat. No. 5,358,397 and U.S. application Ser. No. 10/342,025 filed Jan. 14, 2003, both which are incorporated herein by reference for all purposes.

In the illustrated embodiment, the extruder 50 is attached to a robot 52 such that the robot 52 can move the extruder 50 as it applies the material 12 to the surface of the mold 26 in a pattern. During application, the table 40 preferably maintains the mold 26 stationary at a predetermined location 54, but may move the mold 26 during application if so desired. In other alternative embodiments, the mold may be otherwise moved (e.g., by conveyor belt of the like) during application and the extruder may be stationary. As another alternative, the mold and the extruder may move during application.

According to one preferred embodiment of the invention, the extruder 50 employed is a single screw extruder, which may also be known a kneader, a continuous kneader or a co-kneader, but may be a multi-screw (e.g., twin screw extruder). When used, the single screw extruder preferably includes a single segmented screw with interrupted screw flights and stationary pins both located in an extruder barrel. In operation, the single screw extruder preferably performs a distributive type mixing upon the material. As an example, such mixing may be obtained by having the screw rotate and reciprocate back and forth at the same time such that the material 12 is mixed due to forward pumping but the material 12 is also divided each time it passes a pin for causing the distributive type mixing.

Advantageously, the single screw extruder, the distributive mixing or both can provide sufficient intermixing of material ingredients while imparting lower energy to the material thereby maintaining and applying the material at a lower temperature. In turn, more reactive or lower activation temperature blowing agents, blowing agent activators or both may be employed for producing improved materials. As an example, it is contemplated that such an extruder can maintain and can apply material at temperatures of less than about 200° F., more preferably less than about 180° F. and even more preferably less than about 150° F. As an added advantage, it is contemplated that such an extruder is less likely to tear reinforcement fillers such as carbon fibers, glass fibers, nylon fibers or aramid pulp thereby allowing the formation of a material with greater integrity.

After the material 12 has been desirably disposed upon a surface of the mold 26, and again referring to FIGS. 1A-3B, the adhesion surface 22 of the member 14 is contacted with the material 12 preferably while the material remains disposed upon the mold 26. In turn, the material 12 adheres to the adhesion surface 22 of the member 14 such that the member 14 along with the material 12 may be moved away from the mold 26.

Preferably, during contacting of the member 14 and the material 12, the member 14 is moved toward the mold 26 such that the material 12 is pressed and shaped against the mold contour 30 and at least one surface of material 12 at least partially assumes the shape of the contour 30. According to such technique, the material 12 may be formed into nearly any shape or configuration depending upon the shape and configuration of a chosen contour.

In the particular embodiment shown, the adhesion surface 22 is contacted with the material 12 such that the material 12 is compressed into the cavity 20 of the mold 26. As shown, the material 12, upon such compression, assumes the shape of the cavity 30 (e.g., the annular channel shape) such that material 12 is formed into an annular strip. Thus, the material 12 has an outer surface 60 and two sloping surfaces 62 extending therefrom. The material 12 also includes a plurality of rings 64 that extend about openings 66 in the member 14.

For assisting in adhering the material 12 to the adhesion surface 22, it may be desirable to heat the surface 22 to a temperature (e.g., greater than about 70° C., 120° C. or 150° C.) that will at least locally melt the material 12 contacted by the surface 22. In turn, the molten material wets the adhesion surface 22 thereby promoting adhesion of the material 12 to the surface 22. Preferably, such wetting is accomplished without substantially activating the material 12 if the material is activatable (e.g., expandable).

Prior to and/or after moving the member 14 and the material 12 away from the mold 26, it is typically desirable to allow a predetermined cooling time to pass, particularly where the adhesion surface 22 has been heated. Such cooling time can allow for curing, and thus further adhesion of the material 12 and particularly the molten portion of the material 12 to the adhesion surface 22. Preferred cooling times range between about 3 seconds and 30 minutes, more preferably between about 6 seconds and about 5 minutes and even more preferably between about 10 seconds and about 1 minute.

After adhesion of the material 12 to the member 14, the material 12 and the member 14 are typically assembled to an article of manufacture such that the material 12 can provide the article with sealing, baffling, reinforcement, sound absorption, a combination thereof or the like. Generally, it is contemplated that the member to which the material is adhered may be a member of an article of manufacture or may be another member for assisting in applying the material to an article of manufacture.

In the particular embodiment illustrated, fasteners 70 are extended through the openings 66 (e.g., through-holes) in the member 14 and the fasteners are employed to attach the member 14 to one or more members of the vehicle such as a floor pan, a frame member, a body member or the like. Thereafter, the material can be expanded as described herein to form a seal, a baffle or the like.

In one alternative embodiment, the material may be applied to a carrier member to form a reinforcement member. In such a case, the reinforcement member will typically be placed in a cavity or other area of an article of manufacture (e.g., an automotive vehicle). In another alternative embodiment, the material may be placed upon a carrier member, which may be attached to an article of manufacture such that the material can expand to fill a cavity of the article for baffling, sealing or a combination thereof within the cavity. It is also contemplated that the material may be applied directly to a member of an article of manufacture for performing any of these functions.

Advantageously, material applied according to the present invention can often maintain its shape, integrity or both better than material applied according to other techniques. Without being bound by any theory, it is suggested that the integrity is maintained because materials, and particularly expandable materials, have a lower amount of residual stress upon application to the member according to the present invention. In turn, the expandable materials undergo less deformation (e.g., shrinkage) as that residual stress is later relaxed or released (e.g., during heating, expansion or the like of the applied material).

Figure 4A:
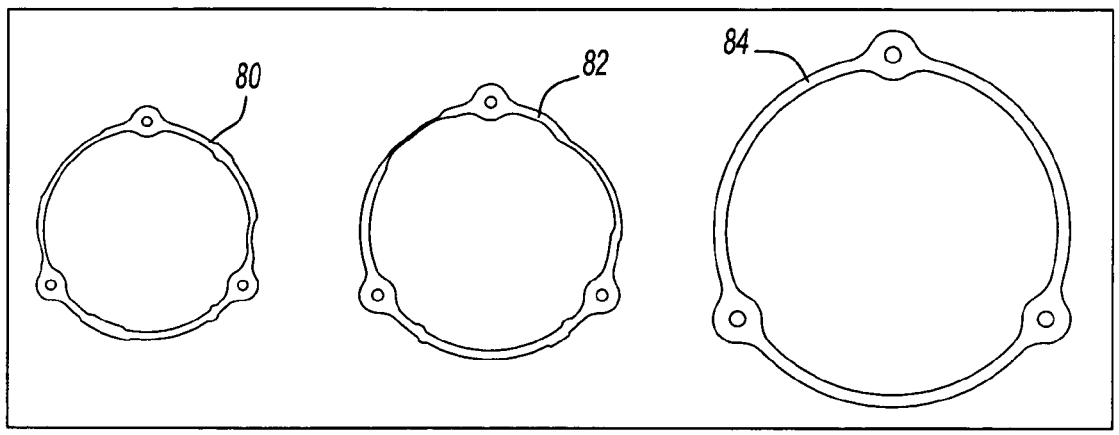
FIGS. 4A and 4B are perspective drawings showing materials applied according to an exemplary process of the present invention and materials applied according to other processes.
Figure 4B:
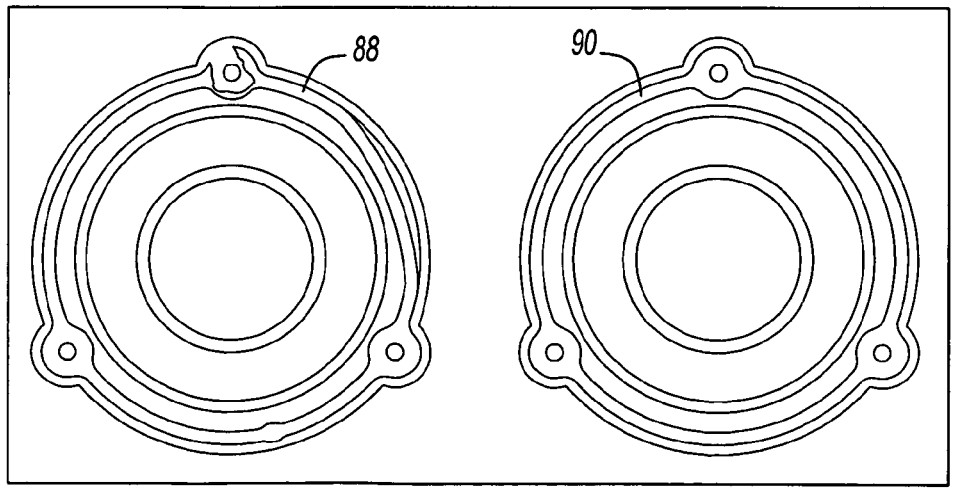
Figure 3A:
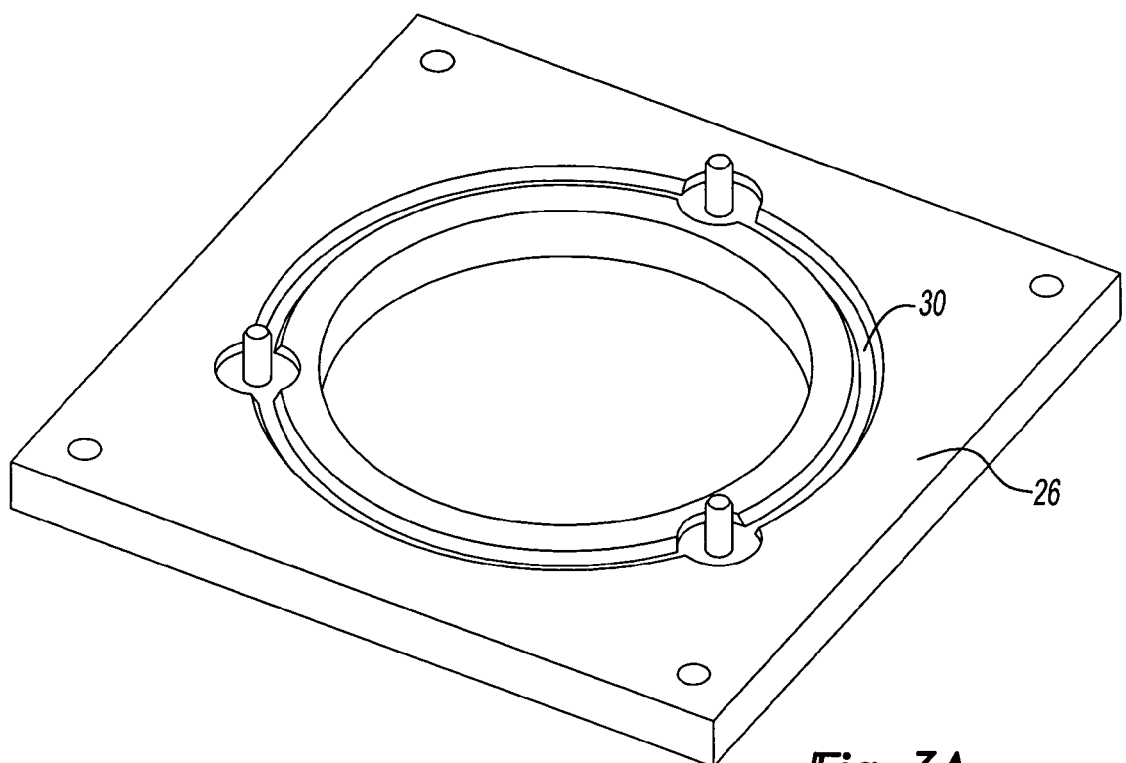
FIG. 3A is a perspective view of an exemplary mold formed in accordance with an aspect of the present invention.
Figure 3B:
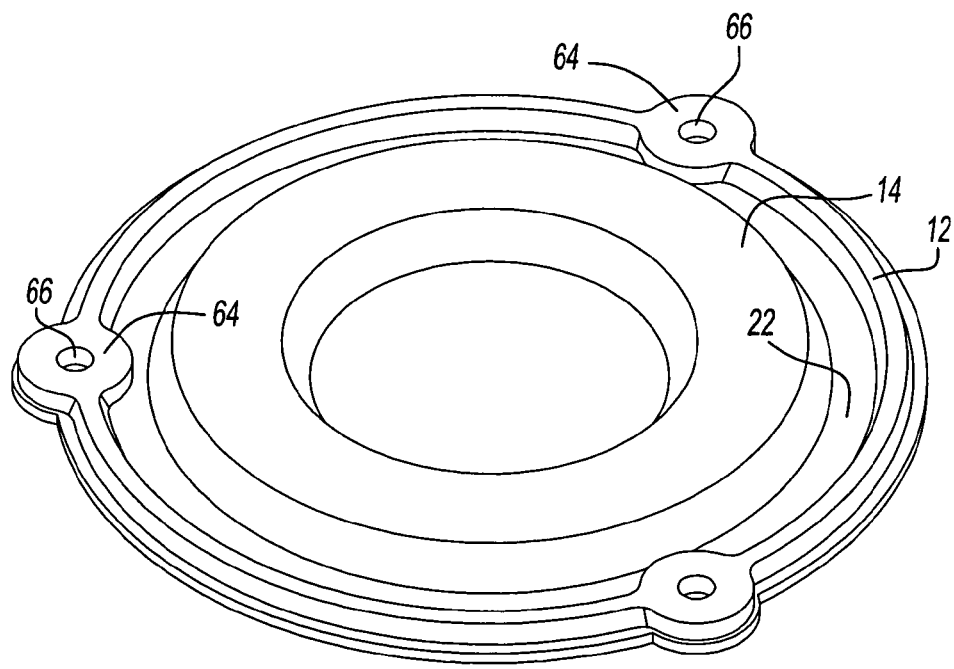
FIG. 3B is a perspective view of an exemplary member, which has had an exemplary material applied thereto according the process of FIG. 2.
Figure 5A:
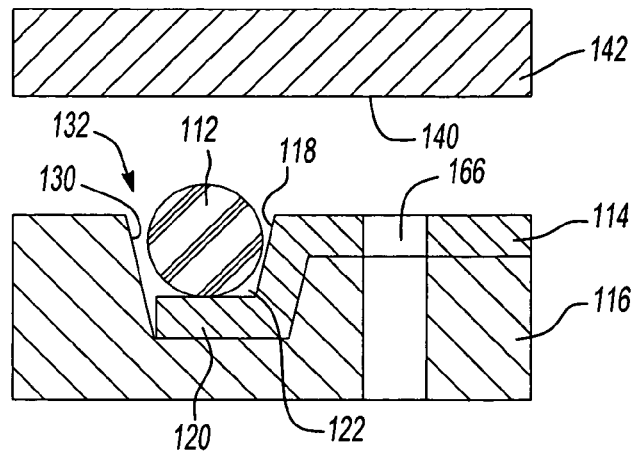
FIGS. 5A-5D are sectional views of a member and a mold during application of an expandable material to the member according to an exemplary process of the present invention.
Figure 5B:
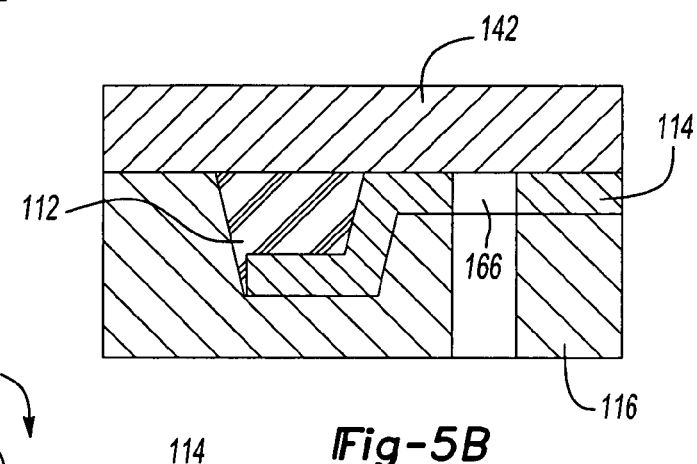
Figure 5C:
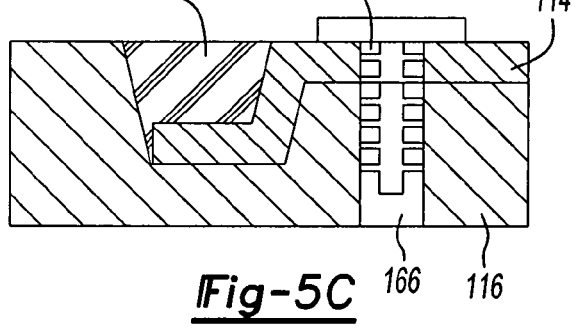
Figure 5D:
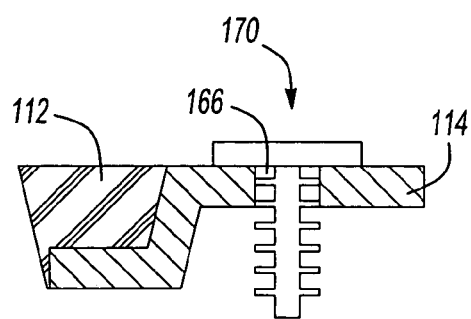
Figure 5D:
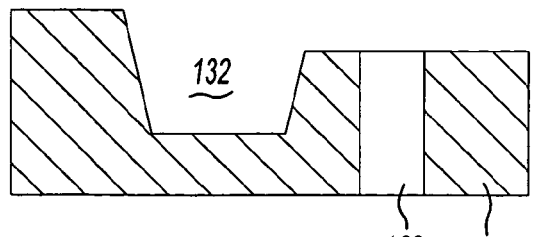

Referring to FIG. 4A, there is illustrated a set of seals 80, 82, 84 for comparison. The seal 80 on the left and the seal 82 in the middle were formed according to prior processes while the seal 84 on the right was formed in accordance with the present invention. As can be seen, the seal 84 formed according to the present invention undergoes substantially less shrinkage and/or deformation than the other seals 80, 82, particularly during and after formation. Referring to FIG. 4B, the is illustrated one seal 88 formed upon a member in accordance with a prior process and one seal 90 formed upon a member in accordance with the present invention. As can be seen, the seal 90 formed according to the present invention has experienced less shrinkage, deformation and/or failure than experienced by the other seal 88.

In an alternative embodiment, a member is placed adjacent a mold and the material is applied to the member and the mold simultaneously. As used herein, application of the material to the member or the mold can include the placement of the material directly onto or adjacent to the member or the mold.

Referring to FIGS. 5A-5D, a member 114, shown as a fuel covers sender, is placed atop a mold 116. Like previous embodiments, the member 114 includes a surface 118 suitable for receiving a material 112 and the mold 116 includes a contour, shown as a cavity 130. As can be seen, the member 114 is shaped to have an extension, shown as a peripheral flange 120, and the flange 120 forms a contour, shown as a cavity 122 in the surface 118 of the member 114.

Typically, the extension or flange 120 corresponds to the contour or cavity 130 of the mold 116. Thus, upon placement of the member 114 adjacent to (e.g., atop) the mold 116, the extension or flange 120 is opposingly fitted to (e.g., abuttingly contacts) walls defining the contour or cavity 130. In the particular embodiment shown, the flange 120 extends into the cavity 130 of the mold 116 such that the cavity 122 of the member 114 and the cavity 130 of the mold 116 combine to form a singular cavity 132 defined by the mold 116 and the member 114.

The material 112 is applied to the mold 116 and the member 114 simultaneously and, in the particular embodiment of FIGS. 5A-5D, is placed within the cavity 132 defined by the mold 116 and the member 114. As shown, the material 112 is placed in direct contact with the adhesion surface 118 defining the cavity 122 of the member 114, however, it may be otherwise located if needed or desired.

After the material 112 has been desirably disposed in the cavity 132, a surface 140 (e.g., a non-stick surface) of a secondary member 142 is contacted with the material 112 preferably while the material 112 remains disposed in the cavity 132. In turn, the material 112 adheres to the adhesion surface 118 of the member 114 such that the member 114 along with the material 112 may be moved away from the mold 116.

Typically, during contacting of the secondary member 142 and the material 112, the secondary member 142 is moved toward the mold 116 and the member 114 such that the material 112 is pressed and shaped against the wall of the mold contour 130 and the wall of the contour 122 wall of the member 114 and the material 112 at least partially conforms to or assumes the shape of the contours 122, 130. According to such technique, the material 112 may be formed into nearly any shape or configuration depending upon the shape and configuration of the chosen contours. In the particular embodiment shown, the material 112, upon such compression or conforming, assumes the annular channel shape of the cavity 132 such that material 112 is formed into an annular strip.

For assisting in adhering the material 112 to the adhesion surface 118, it may be desirable to heat the surface 118 to a temperature (e.g., greater than about 70° C., 120° C. or 150° C.) that will at least locally melt the material 112 contacted by the surface 118. In turn, the molten material wets the adhesion surface 118 thereby promoting adhesion of the material 112 to the surface 118. Preferably, such wetting is accomplished without substantially activating the material 112 if the material is activatable (e.g., expandable).

Prior to and/or after moving the member 114 and the material 112 away from the mold 116, it is typically desirable to allow a predetermined cooling time to pass, particularly where the adhesion surface 118 has been heated. Such cooling time can allow for curing, and thus further adhesion of the material 112 and particularly the molten portion of the material 112 to the adhesion surface 118. Preferred cooling times range between about 3 seconds and 30 minutes, more preferably between about 6 seconds and about 5 minutes and even more preferably between about 10 seconds and about 1 minute.

After adhesion of the material 112 to the member 114, the material 112 and the member 114 are typically assembled to an article of manufacture such that the material 112 can provide the article with sealing, baffling, reinforcement, sound absorption, a combination thereof or the like. Generally, it is contemplated that the member to which the material is adhered may be a member of an article of manufacture or may be another member for assisting in applying the material to an article of manufacture.

In the particular embodiment illustrated, fasteners 170 are extended through the openings 166 (e.g., through-holes) in the member 114 and the fasteners are employed to attach the member 114 to one or more members of the vehicle such as a floor pan, a frame member, a body member or the like. Thereafter, the material can be expanded as described herein to form a seal, a baffle or the like.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A process for applying a material to a member, the process comprising:
   providing a member having a surface suitable for receiving a material;
   providing a mold having at least one contour;
   locating the mold upon a rotating table surface;
   placing the member adjacent to the mold, wherein the surface of the member includes a contour;
   extruding a bead of the material robotically as a continuous bead in a viscoelastic state to the mold, the member or both and wherein the material includes a relatively minimal amount of residual stress upon application of the material to the member such that the material undergoes less deformation, wherein:
   i) the material is positioned adjacent the at least one contour of the mold, the surface of the member or both with an automated apparatus; and
   ii) the material is a thermally activatable polymeric sealing or reinforcing material that is activated at a temperature greater than about 70 degrees Celsius, 120 degrees Celsius or 150 degrees Celsius;
   conforming the material, in a viscoelastic state, at least partially to the shape of the at least one contour of the mold and the contour of the member while the material is contacting the surface of the member, such that the material is formed into any shape or configuration depending upon the shape and configuration of the chosen contour; and
   moving the member away from the mold with the material adhered to the surface of the member by rotating the rotating table surface.

2. A process as in claim 1 wherein the automated apparatus includes an extruder, the at least one contour forms at least one cavity and the step of applying the material to the mold includes extruding the material into the at least one cavity of the mold.

3. A process as in claim 1 wherein the automated apparatus includes a robot for moving the extruder relative to the mold during application of the material to the mold.

4. A process as in claim 1 wherein the material is heat expandable.

5. A process as in claim 1 wherein the member is part of an automotive vehicle.

6. A process as in claim 5 wherein the member is a cover fuel sender.

7. A process as in claim 1 further comprising activating the material to expand, cure or both in a paint processing step.

8. A process as in claim 1 further comprising heating the surface of the member prior to contacting the surface of the member with the material.

9. A process as in claim 1 wherein the material is applied to the mold at a temperature below 100° C.

10. A process as in claim 1 wherein the step of contacting the surface of the member to the material includes moving the member toward the mold such that the material is pressed and shaped against the at least one contour.

11. A process for applying a material to a member of an automotive vehicle, the process comprising:
    providing a member of an automotive vehicle, the member having a surface suitable for receiving a material;
    providing a mold having at least one cavity suitable for receiving a material;
    locating the mold upon a rotating table surface;
    placing the member adjacent to the mold, wherein the surface of the member includes a cavity;
    extruding a bead of the material robotically as a continuous bead in a viscoelastic state to the mold, the member or both and the material includes a relatively minimal amount of residual stress upon application of the material to the member such that the material undergoes less deformation, wherein:
    i) the material is extruded into the at least one cavity with an automated apparatus that includes an extruder and a robot for moving the extruder relative to the mold; and
    ii) the material is a thermally activatable sealing or reinforcing material that is activated at a temperature greater than about 70 degrees Celsius, 120 degrees Celsius or 150 degrees Celsius;
    conforming the material, in a viscoelastic state, at least partially to the shape of the at least one cavity of the mold and the cavity of the material contacting the surface of the member, such that the material is formed into any shape or configuration depending upon the shape and configuration of the chosen cavity;
    moving the member away from the mold with the material adhered to the surface of the member by rotating the rotating table surface; and
    activating the material at elevated temperatures during a paint processing step of the automotive vehicle.

12. A process as in claim 11 wherein the member is a cover fuel sender.

13. A process as in claim 11 further comprising heating the surface of the member prior to contacting the surface of the member with the material.

14. A process as in claim 11 wherein the material is applied to the mold at a temperature below 100° C.

15. A process for applying a material to a member of an automotive vehicle, the process comprising:
    providing a member of an automotive vehicle, the member having a surface suitable for receiving a material, the member being a cover fuel sender;
    providing a mold having at least one cavity suitable for receiving a material;
    locating the mold upon a rotating table surface;
    placing the member adjacent to the mold, and wherein the surface of the member includes a cavity;
    extruding a bead of the material robotically as a continuous bead to the mold, the member or both in a viscoelastic state at a temperature below 70° C. and wherein the material includes a relatively minimal amount of residual stress upon application of the material to the member such that the material undergoes less deformation, wherein
    i) the material is extruded into the at least one cavity with an automated apparatus that includes an extruder and a robot for moving the extruder relative to the mold; and
    ii) the material is thermally activatable, heat expandable and heat curable material that is activated at a temperature greater than about 70 degrees Celsius, 120 degrees Celsius or 150 degrees Celsius;
    conforming the material, in a viscoelastic state, at least partially to the shape of the at least one cavity of the mold and the cavity of the material contacting the surface of the member, such that the material is formed into any shape or configuration depending upon the shape and configuration of the chosen cavity;
    moving the member away from the mold with the material adhered to the surface of the member by rotating the rotating table surface; and
    curing the material at elevated temperatures during a paint processing step of the automotive vehicle.

* * * * *